(12) United States Patent
Frye

(10) Patent No.: US 6,734,390 B1
(45) Date of Patent: May 11, 2004

(54) LASER CUTTING HOLES BY TREPANNING ON THE FLY

(75) Inventor: Lowell D. Frye, Chandler, AZ (US)

(73) Assignee: Honeywell International, Inc., Morristown, NJ (US)

(*) Notice: Subject to any disclaimer, the term of this patent is extended or adjusted under 35 U.S.C. 154(b) by 0 days.

(21) Appl. No.: 10/396,027

(22) Filed: Mar. 24, 2003

(51) Int. Cl.[7] .............................................. B23K 26/38
(52) U.S. Cl. .............................. 219/121.7; 219/121.71
(58) Field of Search ......................... 219/121.7, 121.71

(56) References Cited

U.S. PATENT DOCUMENTS

| 3,576,965 A | 5/1968 | Gugger |
| 4,737,613 A | 4/1988 | Frye |
| 4,896,944 A | 1/1990 | Irwin et al. |
| 4,952,789 A | 8/1990 | Suttie |
| 5,037,183 A * | 8/1991 | Gagosz et al. .............. 359/212 |
| 5,043,553 A | 8/1991 | Corfe et al. |
| 5,223,692 A | 6/1993 | Lozier et al. |
| 5,837,964 A | 11/1998 | Emer et al. |
| 6,032,361 A | 3/2000 | Makino et al. |
| 6,034,349 A * | 3/2000 | Ota ....................... 219/121.73 |
| 6,130,405 A | 10/2000 | Loringer |
| 6,541,732 B2 * | 4/2003 | Hirose et al. ............ 219/121.7 |

* cited by examiner

Primary Examiner—Geoffrey S. Evans
(74) Attorney, Agent, or Firm—Robert Desmond, Esq.

(57) ABSTRACT

A system and method for trepanning holes into a work piece as relative movement between the work piece and a pulsed laser occurs. As a cylindrical work piece rotates for example, a position controlled pulse laser fires a first series of timed pulses. During each subsequent rotation of said work piece another series of pulses is fired such that the periphery of a row of identical holes is cut into the cylindrical work piece.

29 Claims, 3 Drawing Sheets

LASER CUTTING HOLES BY TREPANNING ON THE FLY

BACKGROUND OF THE INVENTION

The present invention relates generally to laser cutting of holes, and more particularly to apparatus and methods to trepan a plurality of holes into a cylindrical work surface.

It is common practice to use computer targeted lasers to drill holes into metal surfaces. Lasers are particularly useful in drilling holes into alloys of metal that are particularly tough to machine. One application is in aircraft turbine engines where multiple small diameter holes must be drilled, often at an angle, into tough alloy material.

U.S. Pat. No. 6,130,405 shows one prior art method of drilling holes using a laser. In the method of this patent the work piece is continuously rotated and a computer controlled laser punches holes into the work piece. Laser pulses are timed with the rotation of the work piece such that a row of spaced holes are created. U.S. Pat. No. 6,130,405 is limited to creating holes having a diameter equal to the diameter of the laser beam. This technique is useful in creating holes having a diameter in the range of 0.01 to 0.03 inches. However many of the holes required are going to have a larger diameter than is possible to cut with this method.

Another prior art example of laser cutting holes in a cylindrical work piece is U.S. Pat. No. 4,952,789 to Suttie. In the Suttie device, a laser L is used to cut a plurality of holes in a cylindrical work surface. Again, the diameter of the holes laser drilled in the work piece is determined by the diameter of the laser beam used for drilling.

U.S. Pat. No. 5,223,692 to Lozier et al. discloses a method of laser trepanning that can be used to cut a hole in a work piece having a diameter larger then the diameter of the laser beam. While the method of Lozier can be used to cut a larger diameter hole, it is very slow to use in applications where 100 or more holes can be spaced out in a row around a cylindrical work piece.

As can be seen, there is a need for an improved method and system of drilling holes in a cylindrical work surface using a laser. There is a need for a system and method that will allow for rapid cutting of holes having a diameter larger then the diameter of the laser beam used to cut the holes.

SUMMARY OF THE INVENTION

In one aspect of the invention, there is continuous movement between a work piece and a pulsed laser that sequentially trepans a plurality of holes arranged around the work piece. Each hole to be cut in the work piece is larger then the diameter of the laser beam, and requires a sequence of laser pulses targeted at its periphery to complete the hole.

In another aspect of the invention, a first series of small trepan cuts are made into the work piece, the laser is then targeted to the next trepan position and a second series of trepan cuts are made. The cuts in the first and second series of cuts are connected to form a portion of the periphery of a series of holes to be cut. Targeting to the next trepan position is done while the work piece continues to rotate from the last hole in the row back to the first hole in the row.

In a further aspect of the invention, a sensor detects that the cylindrical work piece is properly positioned relative to said laser prior to each laser pulse.

In a still further aspect of the invention, a programmable controller is used in a method to set the characteristics of the series of holes to be cut into the cylindrical work piece. Programmable steps include setting the hole angle, hole diameter, and number of holes to be cut. A hole can be cut normal to the surface of the cylindrical work piece, or a hole can be cut at an angle to the normal.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

In laser drilling a row of holes into a cylindrical work piece it is desirable to be able to drill the holes as rapidly as possible to minimize the time required to manufacture the work piece.

Figure 1:
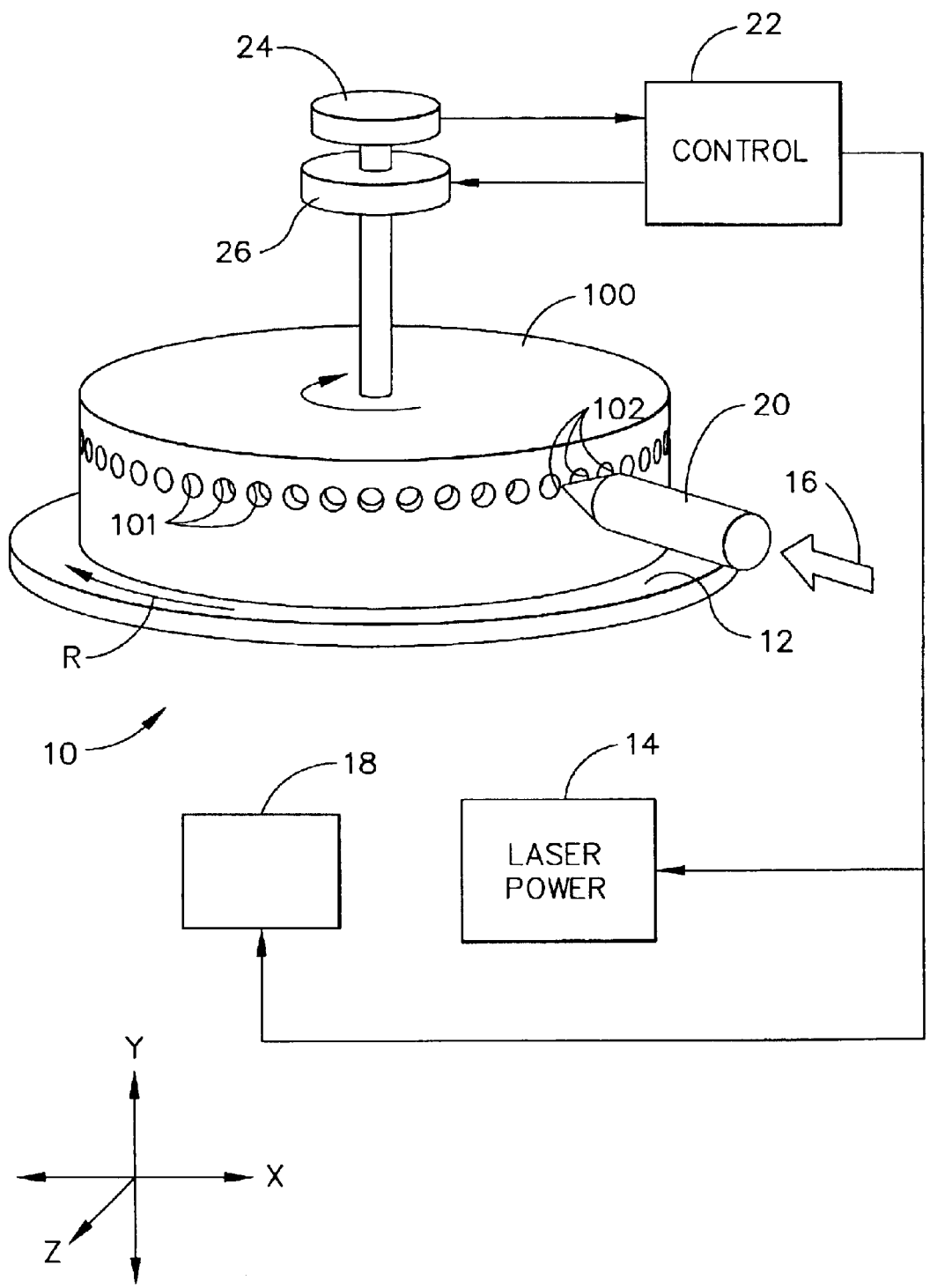
FIG. 1 shows a perspective view of the system in use on a piece part.

Referring now to the Figures, FIG. 1 shows a view, of the laser cutting system 10 in use on a cylindrical work piece 100. The cylindrical work piece 100 can be constantly rotated on table 12 as indicated by arrow R. As the cylindrical work piece 100 rotates, the laser power supply 14 can send a laser pulse 16 of laser energy through laser lens 20 when laser shutter 18 is open. A number of partially cut holes, 101, 102, can be formed in a row evenly spaced around the periphery of the cylindrical work piece 100. Although holes are normally evenly spaced, gaps in this even spacing can be created simply by holding the shutter 18 closed to block some pulses to stop the cutting of some of the holes. The position of the laser lens 20 relative to the cylindrical work piece 100 can be controlled by a computer controller 22. In addition to rotation, the table 12 can move up and down and to the left and right to control the trepan position of the laser lens 20 relative to the piece part 100. The controller 22 receives feedback from position sensor 24. Drive 26 can control the rotation of the table 12 as well as controlling the trepan position through control 22.

Figure 2:
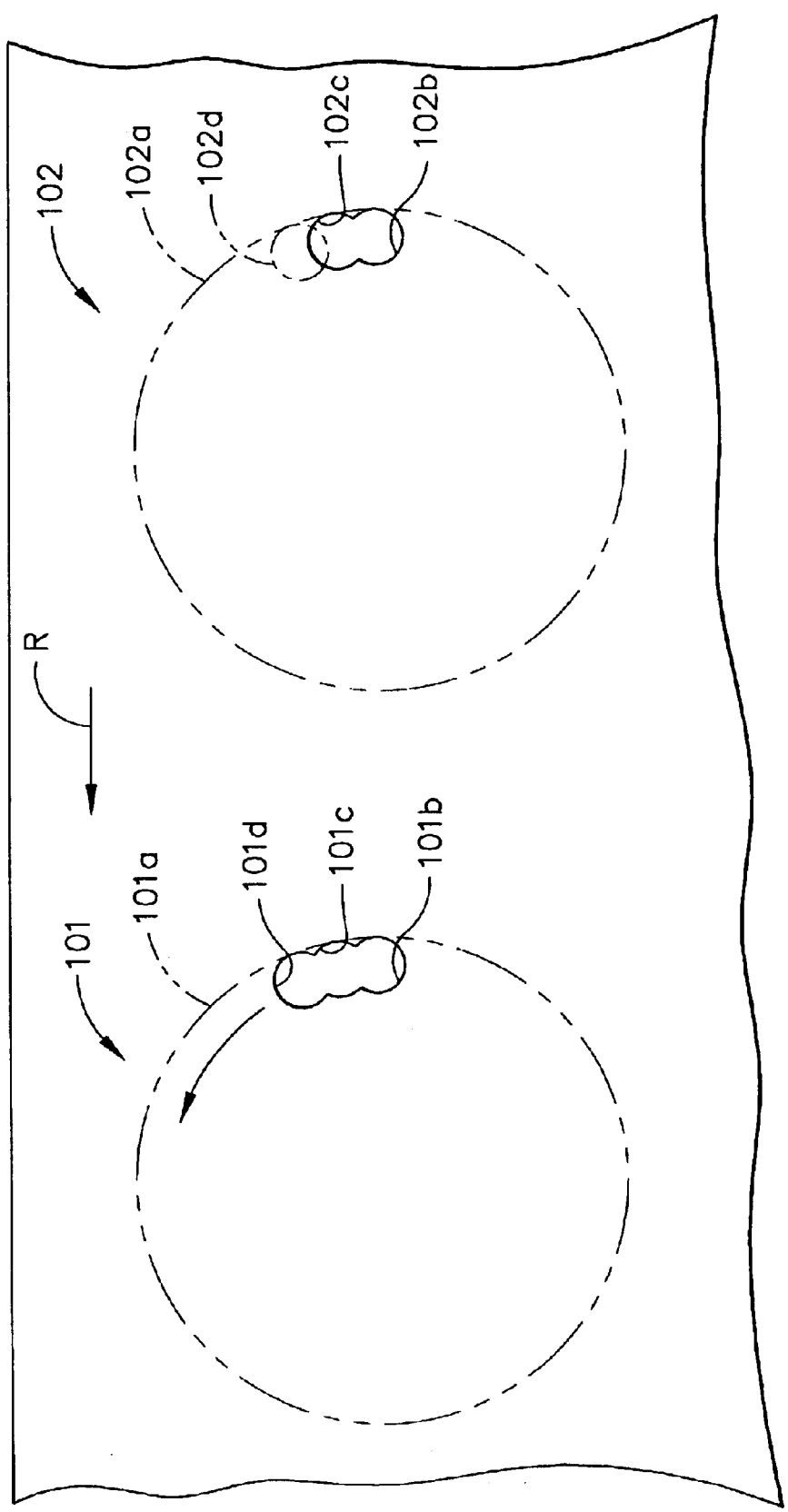
FIG. 2 shows enlarged view of a portion of the piece part.

FIG. 2 shows details of how the two partially cut holes 101, 102 are formed. Dashed lines 101a and 102a show the trepan path that laser lens 20 will trace out on part 100 as table 12 is moved by controller 22 in forming the partially cut holes 101 and 102. The arrow R shows the direction of rotation of the cylindrical work piece 100. A cut 101d from a laser pulse 16 has just formed a portion of the periphery of partial hole 101 and the rotation R will carry the cylindrical work piece 100 to position the next cut 102d, shown in phantom lines, under the laser 20.

Figure 3:
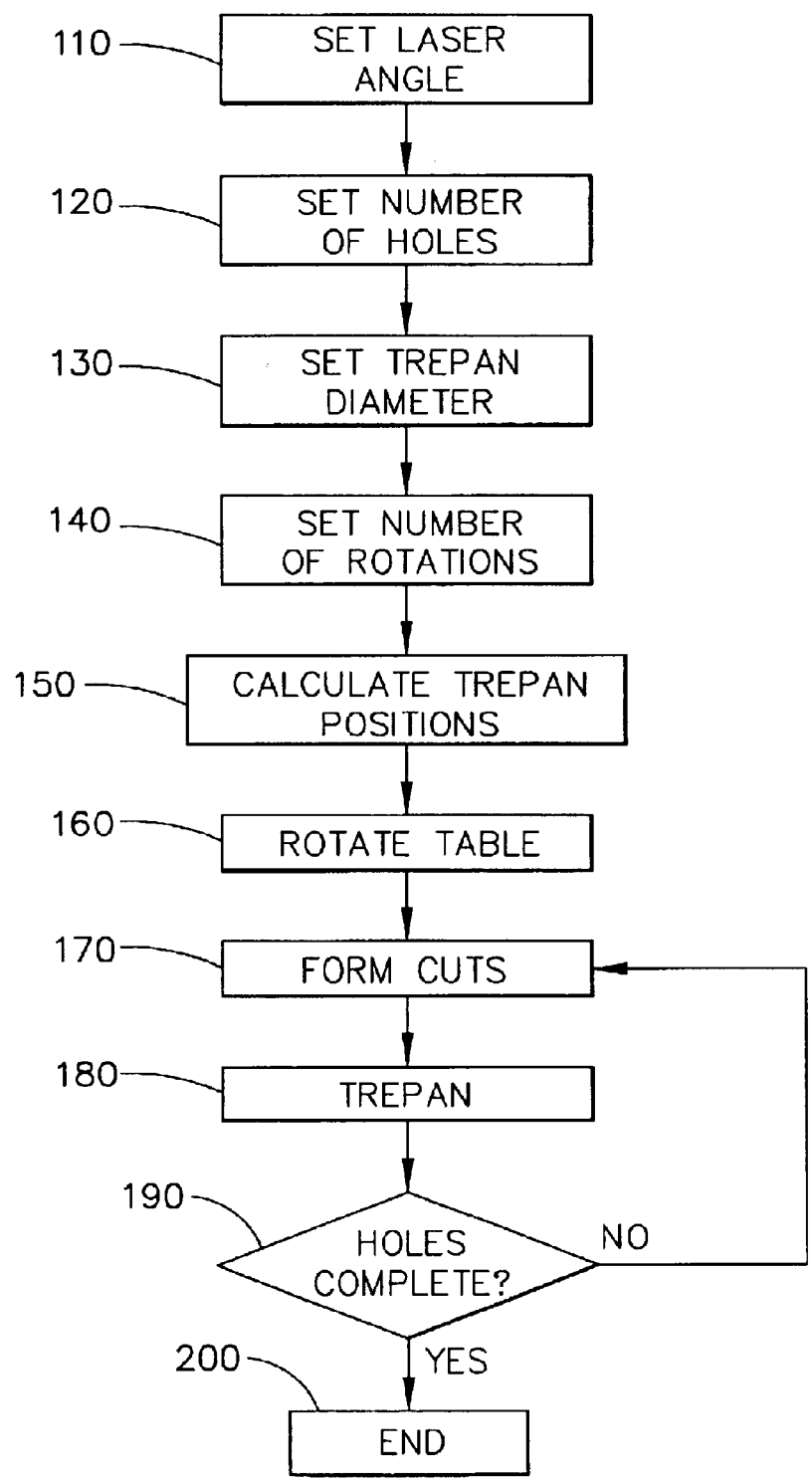
FIG. 3 shows the process flow chart.

FIG. 3 shows the basic steps used in controller 22. The table 12 can be set to an angle in the set laser angle step 110. Any angle of hole might be cut using this arrangement, though not shown it would also be possible to set an angle by moving the laser lens 20. The system 10 can create holes 101,102 at any angle relative to the surface of cylindrical work piece 100 including holes angled up or down, left or right or compound angles. Next the number of holes can be set in step 120 and the diameter of the holes can be set in step 130. The number of cuts 101*b,c,d* and 102*b,c,d* required to complete a hole 101,102 can be set in step 140. A typical hole 101,102 might require 36 cuts depending upon the diameter of the hole 101,102. Such a hole 101,102 would require 36 rotations of the cylindrical work piece 100 to complete all holes 101,102 assuming that each cut 101*b,c,d* and 102*b,c,d* pass clear through the wall thickness of cylindrical work piece 100. If multiple pulses 16 are required for each cut 101*b,c,d* and 102*b,c,d* then this would multiply the number of rotations required. The coordinates of each trepan position on path 101 a can be calculated. Most holes 101 require just x and y coordinates, though a z component might be required for large holes 101 where focusing of the laser lens 20 might be required. Once the set up steps 110–150 are complete the table can begin to rotate in step 160. A first set of cuts 101*b*,102*b* can be made in the form cuts step 170 and once a set of cuts 101*b*,102*b* are completed then the table 12 can trepan through step 180 to the next cut location 101*c*,102*c* and so on. For thick walled work pieces a plurality of laser pulses 16 can be used for each trepan location; this would require more than one work piece 100 rotation per cut. Step 190 can check to see if all the programmed cuts 101*b,c,d* have been made. If not, the laser cutting system 10 can return to step 170 and perform another set of cuts. Once the holes 101,102 are complete, and cuts have been made through the entire path 101*a*, 102*a*, then the control sequence can end and the table 12 can shut off and the completed cylindrical work piece can be removed.

Because the duration of the laser pulse is very short (typically about 0.5 milliseconds), the table 12 can be rotated at a constant speed in direction R without stopping the table for each pulse. The laser lens 20 can fire evenly timed pulses creating a series of evenly spaced cuts 101*b*, 102*b* around the cylindrical work piece 100. When the cylindrical work piece 100 completes one rotation, the laser lens 20 can trepan to the next location to make cut 101*c*. Once cut 101*c* is made, the cylindrical work piece 100 continues to rotate until cut 102 *c* can be made. The cylindrical work piece completes another rotation, the laser lens 20 trepans to make cut 101*d*. Ideally the pulse rate of the laser power supply 14 can be constant in timing with the rotation of the table 12, however the sensor 24 must confirm that the cylindrical work piece 100 is in the correct location prior to each laser pulse 16. FIG. 2 shows that the cut 101*d* has just been made and that the laser lens 20 can next trepan to make cut 102*d*. Thus, in FIG. 1 partial holes 101 are those that have cut 101 *d* and partial holes 102 do not have this cut d made yet. As the cylindrical work piece 100 continues to rotate, the laser lens 20, controlled by controller 22, will trace out the path 101*a* and complete each partial hole 101,102.

It should be understood that the controller 22 could control the laser lens 20 to cut out a variety of shapes other than circles, including ellipses, rectangles, and irregular shapes, and would not be limited to a circular path as shown. Also, it should be understood that the process could be used on any rotatable part including cylinders as disclosed but also flat plates, cones, tori, spheres and others that would be obvious to one skilled in the art. While the process of this invention is most applicable to making holes in metals, it could also be used to make holes in other materials, such as plastics, paper and ceramics. Also, while the table trepans in the example shown, the process would work equally well if the laser lens 20 was moved to the trepan positions instead. Further although a laser having a circular cross sectional pulse has been described, the system would also work with a laser having a pulse with a different cross sectional shape such as square.

It should be understood, of course, that the foregoing relates to preferred embodiments of the invention and that modifications may be made without departing from the spirit and scope of the invention as set forth in the following claims.

I claim:

1. A system for trepanning each hole in a row of at least 2 holes into a work piece comprising;

a pulsed laser;

a control for positioning and targeting said pulsed laser at each of a plurality of trepanning positions;

said control having a first trepanning position wherein said pulsed laser can create a first series of laser trepan cuts corresponding to a portion of said each hole in said row of holes in said work piece during relative movement between said work piece and said pulsed laser, and said control having a second position for creating a second series of trepan cuts as relative movement between said work piece and said pulsed laser occurs and wherein said first series of trepan cuts and said second series of trepan cuts partially overlap to create a portion of each said hole in said row of holes wherein said portion of each said hole has a cross sectional area larger than the cross sectional area of said laser pulse.

2. The system of claim 1, wherein pulses from said pulsed laser are timed to correspond to a rate of the relative movement of the work piece to the pulsed laser such that said trepan positions are evenly spaced on the work piece.

3. The system of claim 1, wherein the control includes a computer numerical control.

4. The system of claim 1, wherein said plurality of trepanning positions corresponding to a periphery of each said hole in said row of holes and wherein a plurality of laser pulses fired at each of said positions creates said row of holes in said work piece.

5. The system of claim 3, wherein said trepan cuts are circular.

6. The system of claim 1, wherein the work piece is metal.

7. The system of claim 1, wherein the work piece moves and the movement is continuous and does not stop during said pulse(s).

8. The system of claim 1, wherein the system includes a rotary table and the work piece is on the rotary table.

9. A system for trepanning each hole in a row of at least 2 holes into a cylindrical work piece comprising;

a pulsed laser;

a control for positioning and targeting said pulsed laser at each of a plurality of trepanning positions;

said control having a first trepanning position wherein said pulsed laser can create a first series of laser trepan cuts corresponding to a portion of said each hole in said row of holes in said work piece during movement of said work piece, and said control having a second position for creating a second series of trepan cuts during the movement of said work piece and wherein said first series of trepan cuts and said second series of trepan cuts partially overlap to create a portion of each said hole in said row of holes and wherein said portion of each said hole has a cross sectional area larger than the cross sectional area of said laser pulse.

10. A method for trepanning a periphery of each hole of a row of holes into a cylindrical work piece comprising the steps of;

rotating the cylindrical work piece on a table, positioning a work piece relative to a laser, pulsing said laser to create a first row of spaced trepan cuts, repositioning said work piece relative to said laser while continuing to rotate said cylindrical work piece from a position where a last of said trepan cuts is aligned with said laser to a position adjacent a first trepan cut in said row of cuts, pulsing said laser to create a second row of trepan cuts wherein each cut in said first row of trepan cuts is connected to a cut in said second row of trepan cuts to at least partially form the periphery of each said hole in said row of holes.

11. The method of claim 10, including the step of continuing to reposition said work piece relative to said laser, rotate said table and pulse said laser to form a plurality of additional rows of spaced trepan cuts connected to said first and second rows of trepan cuts.

12. The method of claim 10, wherein said plurality of additional rows of spaced trepan cuts connected to said first and second rows of trepan cuts form the periphery of each said hole in said row of holes.

13. The method of claim 12, wherein each said hole is a cylindrical hole having a circular cross-section.

14. The method of claim 12, wherein each said hole has a non-circular cross section.

15. The method of claim 10, including a computer controller to position said laser.

16. A method for trepanning a periphery of each hole of a row of holes into a work piece comprising the steps of;

rotating the work piece, positioning a laser, pulsing said laser to create a first row of spaced trepan cuts in said work piece, repositioning said laser, pulsing said laser to create a second row of trepan cuts in said work piece wherein each trepan cut in said first row of trepan cuts is connected to a cut in said second row of trepan cuts to at least partially form the periphery of each said hole in said row of holes.

17. The method of claim 16, including the step of continuing to reposition said laser, rotate said work piece and pulse said laser to form a plurality of additional rows of spaced trepan cuts connected to said first and second rows of trepan cuts in said work piece.

18. The method of claim 16, wherein each of said trepan cuts are circular.

19. The method of claim 16, wherein said work piece is supported on a rotating work holder.

20. The method of claim 16, wherein the second row of trepan cuts partially overlaps the first row of trepan cuts 21.

21. The method of claim 17, including a computer controller to position said work piece relative to said laser.

22. The method of claim 21, including a sensor to sense the position of said work piece relative to said laser prior to making a trepan cut.

23. A method for trepanning a periphery of each hole of a row of holes into a work piece comprising the steps of;

rotating the work piece, pulsing a laser to create a first row of spaced trepan cuts in said work piece, repositioning said work piece relative to said laser as the work piece continues to rotate and pulsing said laser to create a plurality of rows of spaced trepan cuts in said work piece wherein each trepan cut in said first row of trepan cuts is connected to a cut in each said plurality of rows of trepan cuts to at least partially form the periphery of each said hole in said row of holes.

24. The method of claim 23, wherein a rate of pulsing said laser and a rate of rotation of said work piece determine a spacing between said spaced trepan cuts.

25. The method of claim 24, wherein a sensor senses the position of said work piece prior to each said trepan cut.

26. A method for trepanning a periphery of each hole of a row of holes into a work piece comprising the steps of;

setting a laser angle relative to the work piece, programming a controller for a number of holes to be cut, rotating the work piece, pulsing a laser to create a first row of spaced trepan cuts in said work piece, repositioning said work piece relative to said laser and pulsing said laser to create a plurality of rows of spaced trepan cuts in said work piece wherein each trepan cut in said first row of trepan cuts is connected to a cut in each said plurality of rows of trepan cuts to at least partially form the periphery of each said hole in said row of holes.

27. The method of claim 26, wherein each trepan cut requires a plurality of laser pulses to create.

28. The method of claim 27, wherein the computer controller positions said work piece relative to said laser.

29. The method of claim 28, wherein a sensor senses the position of said work piece prior to each said trepan cut and wherein said sensor sends a signal to said controller to delay the laser pulse if said sensor senses an improper positioning of said work piece.

* * * * *